April 7, 1953     T. M. KNOWLAND     2,633,976
FOOD CONVEYER BELTING
Original Filed May 20, 1947
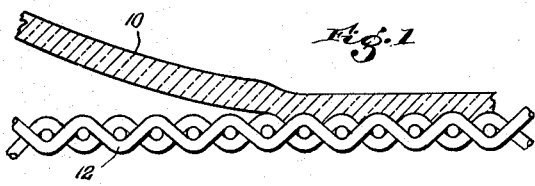
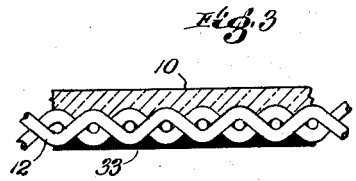
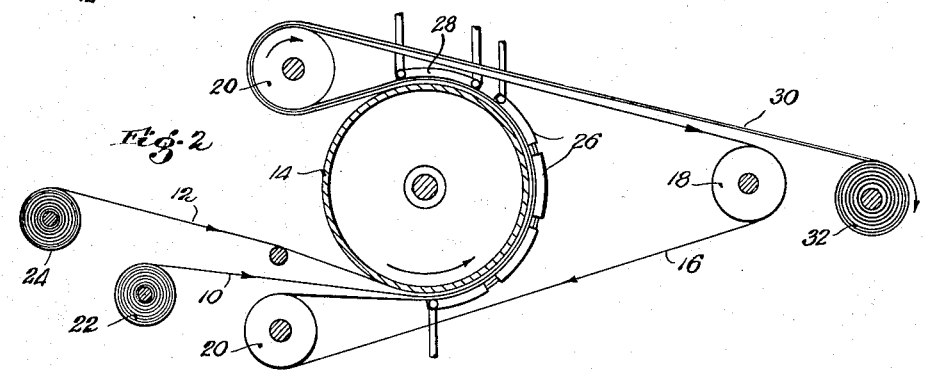
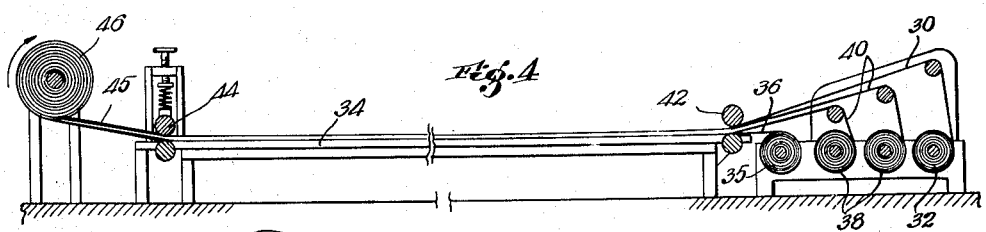
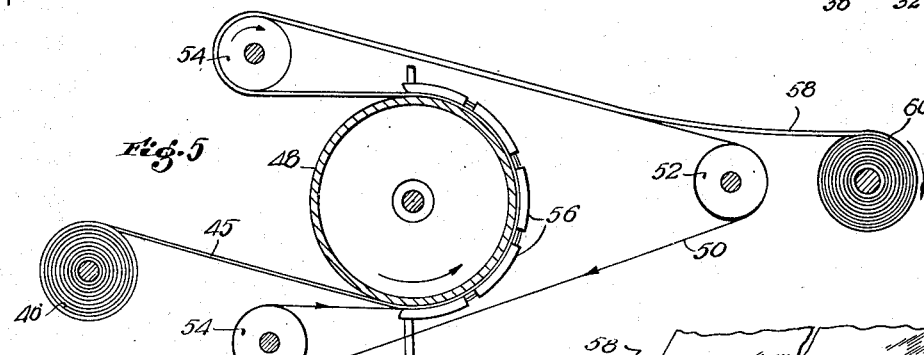
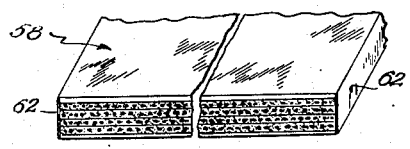
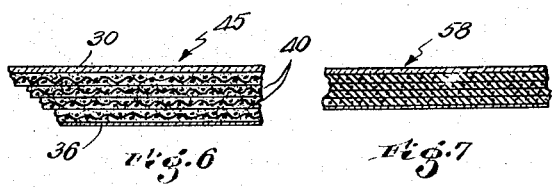
INVENTOR.
Thomas M. Knowland
BY Kenway, Jenney,
Witter & Hildreth, his Attys.

Patented Apr. 7, 1953

2,633,976

UNITED STATES PATENT OFFICE 2,633,976

FOOD CONVEYER BELTING

Thomas M. Knowland, Belmont, Mass., assignor to Boston Woven Hose and Rubber Company, Cambridge, Mass., a corporation of Massachusetts Original application May 20, 1947, Serial No. 749,239. Divided and this application July 14, 1949, Serial No. 104,617

1 Claim. (Cl. 198—193)

This invention relates to conveyor belting particularly adapted for use in the canning and food handling industries. Conveyor belting heretofore employed for this purpose has comprised a vulcanized body of multiple plies of rubberized fabric, constructed in accordance with the usual methods for making conveyor belting, covered with specially compounded white rubber of attractive appearance and readily cleaned. The chief disadvantage of such belting however lies in the fact that the white rubber cover readily absorbs the essential oils and coloring matter from vegetables and fruits, as well as odors where belting is used for handling meats or fish. Under such conditions the rubber belting becomes discolored and unattractive in appearance, difficult or impossible to cleanse and in many instances so badly softened that it is readily worn away and rendered unsuitable for further use. An outstanding advantage of such belting, however, lies in the fact that its plies are vulcanized together with rubber friction compound which forms an extremely strong adhesive bond, insuring long life under flexing, and excellent flexibility at low temperatures. The primary object of my invention resides in the production of an improved conveyor belting for handling food products or oily materials, having characteristics that obviate the disadvantages but retains the advantages of conveyor belting in present use.

The belting of this invention comprises a body of rubberized multiple plies vulcanized into a unit and covered with synthetic plastic composition bonded and vulcanized thereto and forming an integral body therewith. The plastic composition cover is of desirable light color, odorless and resistant to solvents, oils, fats, waxes, vegetable coloring matter and odors, and is easily cleaned. The carcass of the belting is also extremely flexible at all temperatures and thus adapted to bending around conveyor drive and idler pulleys, and the plastic cover combines with the interior body to retain all the advantages heretofore present in conveyor belting.

The construction of my improved belting requires the employment of a vulcanizing temperature approximating 270°–300° F. for bonding the rubberized fabrics together. However, the bonding of the fabric to the plastic composition cover requires a higher temperature that would seriously injure the rubber composition, and an important aspect of my invention consists in a novel method of effecting these operations without injury to the product. In accordance with the invention, the plastic composition is sheeted to the desired thickness and a fabric sheet is bonded to one face thereof under pressure and sufficient heat to cause the plastic to soften, permeate and bond to the fabric sheet. The exposed face of the fabric sheet is thereafter coated with a rubberized friction compound. Two plastic composition sheets as thus prepared are then assembled with their coated faces in contact with a plurality of plies of rubberized fabric disposed therebetween, and the assembly is subjected to pressure and sufficient heat to vulcanize them all into a unit. Thus it will be seen that the outermost fabric sheets are bonded to the plastic composition sheets at a higher temperature in a preliminary operation, and are thereafter bonded to the interior body at a relatively lower temperature during the vulcanizing of the body plies into a unit. The resulting belting therefore comprises a plurality of rubberized fabric plies vulcanized in face-to-face contact into a unit body and covered at both faces with a plastic composition directly bonded thereto and forming a unit part thereof. The production of an improved conveyor belting of this nature comprises a further object of the invention.

These and other features of the invention will be best understood and appreciated from the following description of a preferred embodiment thereof, selected for purposes of illustration and shown in the accompanying drawing in which, Fig. 1 is a fragmentary sectional view through the composite sheet shown as being constructed in Fig. 2, Fig. 2 is a diagrammatic view illustrating the continuous forming of the composite sheet shown in Fig. 1, Fig. 3 is a fragmentary view of the composite sheet shown as rubber frictioned on its fabric face, Fig. 4 is a diagrammatic view illustrating the plying-up of a plurality of strips into a composite strip, Fig. 5 is a diagrammatic view illustrating the continuous vulcanizing of the composite strip formed in Fig. 4, Fig. 6 is an enlarged sectional view through the uncured composite strip being treated in Fig. 5, Fig. 7 is a like view of the cured strip after treatment, and Fig. 8 is a fragmentary end perspective view of the final product.

Referring first to Fig. 1 of the drawing, 10 indicates a sheet of plastic composition which is to form a cover, preferably at both faces, for my improved conveyor belting. The covers may be made from any synthetic plastic material suitable for the purpose but I prefer polyvinyl chloride or vinyl chloride-acetate co-polymer which are thermoplastic oil-resistant types of synthetic resins. The cover can be of any desired thickness, it being usual in food conveying operations to provide a cover approximately 1/16" in thickness on the conveying side and a pulley cover approximately 1/32" in thickness. The first operation consists in sheeting the plastic composition to the desired thickness as illustrated at 10.

The second step in the process consists in strongly bonding to one face of the plastic sheet 10 a ply 12 of cotton duck or other textile fabric commonly employed in belting construction. I preferably carry out this operation in a continuous press of the nature illustrated in Fig. 2 and comprising a heated drum 14 about which extends an endless steel pressure band 16 supported on rolls 18 and 20, the band being tensioned by forcing the roll 18 rearwardly or away from the drum 14.

The sheet 10 and fabric 12 are fed from rolls 22 and 24 in superposed relation into the bight between the drum 14 and the band 16. The drum is steam heated and the portion of the band opposite to the drum is heated by steam jackets 26, both to a temperature sufficient to cause the plastic to soften, permeate into pressure flowed contact and bond to the fabric sheet as the two sheets are compressed between the drum and band. I preferably place the fabric sheet 12 in contact with the drum and the plastic sheet 10 in contact with the band and employ a drum temperature approximating 320° F. and a jacket temperature approximating 340° F. These temperatures have been found sufficient to effect a strong bond between the two sheets. A final cooling jacket 28 is employed to cool the composite sheet 10 following the bonding operation and prior to stripping it from the band. The heating of the product not only softens the plastic 10 to effect the bonding of the two sheets but furthermore serves to relieve the plastic sheet of any internal stresses previously set up in the preforming or calendering operation, and the cooling of the product permits it to be stripped from the band without damage, all as more fully described in Patent 2,434,541 dated January 13, 1948, to John M. Bierer. The resulting composite sheet 30 is formed into a roll 32. This roll is then transferred to a rubber calender and the exposed face of the fabric sheet is coated with a rubber friction compound 33.

The next step in the process consists in assembling on a belt-making table 34 the several plies that are to comprise the final product. This table is ordinarily about 100 feet long and the several plies are drawn thereonto in superposed relation from a series of supply rolls 32, 35 and 38. The two end rolls 32 and 35 provide the two covers for the belting, the plastic sheet 36 in the roll 35 being somewhat the thinner of the two. The rolls 38 comprise the usual cotton duck employed in belt construction and these sheets are impregnated with rubber compound as are the fabric faces of the sheets 30 and 36. The superposed layers, with the plastic sheets facing outwardly are formed on and passed along the table, first between guide rolls 42 and finally between pressure rolls 44, and the resulting composite product 45 is then formed into a roll 46.

The composite strip 45, comprising two or more rubberized plies 40 of cotton duck in contact with and sandwiched between the rubberized fabric faces of the cover sheets 30 and 36, is next vulcanized into a unit product, preferably in a continuous vulcanizing press of the nature illustrated in Fig. 5 and comprising a vulcanizing drum 48 about which extends an endless steel pressure band 50 supported on rolls 52 and 54, the band being tensioned by adjusting the roll 52 rearwardly.

The prepared strip 45 is fed from the roll 46 into the bight between the heated drum 48 and the pressure band 50 and is held under high compression between the drum and band in its travel about the drum. The drum is steam heated and the portion of the band opposite to the drum is heated by steam jackets 56, both to a temperature approximating 270° F. which is sufficiently high to vulcanize the rubberized plies into a unit. The vulcanized product 58, comprising a body of compressed fabric plies 12 and 40 securely bonded together by vulcanization and covered at both faces by plastic sheets 10 securely bonded to the outermost fabric plies 12 of the body, is led from the press and formed into a roll 60.

It will now be apparent that my new process requires the employment of different temperatures to effect the bonding of the plastic covers to the outermost fabric plies and the bonding of the inner fabric plies together, and these steps are carried out without injury or deterioration to the product. The uniting of the plastic covers to their fabric plies requires a relatively high temperature approximating 320°–360° F. while the vulcanizing operation requires a relatively lower temperature approximating 270°–300° F. Furthermore, whereas a temperature higher than 300° F. might seriously injure and destroy the vulcanized portion of the belting if subjected thereto for a sufficient period of time, such temperature does not distort or injure the plastic covers or affect the bond between the plastic sheets and their fabric facings.

The plies of rubberized fabric in the vulcanized belting 58 are covered at both faces but exposed at the two edges of the belting, and I preferably coat these edges with a Vinylite cement which bonds thereto and combines with the plastic covers and effects a complete enclosing of the belt body within a synthetic composition bonded thereto. This cement is applied by spraying or brushing a plurality of coats of the cement on the edges until a layer 62 of the desired thickness is obtained.

It is believed that the construction and advantages of my improved belting will now be apparent. It has all the advantages of a plastic outer protective coating, including resistance to solvents, oils, fats, waxes, vegetable coloring matter and odors, and ease of cleaning. It also retains all the advantages of rubber belting, including the body strength effected by vulcanization and extreme flexibility at all temperatures and therefore capable of being readily bent around various conveyor drive and idler pulleys.

This invention is a division of my copending application Serial No. 749,239, filed May 20, 1947, now Patent No. 2,515,778.

Having thus disclosed my invention what I claim as new and desire to secure by Letters Patent is:

A food conveyor belting comprising a unitary flexible body of a plurality of rubberized fabric plies vulcanized together in face-to-face contact, an outer fabric ply bonded at its inner surface directly to said flexible body, and a surface ply of a continuous stress-relieved sheet of an oil-resistant synthetic resin permanently bonded in direct adhesive contact to the outer surface of said outer fabric ply independently of the vulcanized construction.

THOMAS M. KNOWLAND.

REFERENCES CITED

The following references are of record in the file of this patent:

UNITED STATES PATENTS

| Number | Name | Date |
| --- | --- | --- |
| 1,865,310 | Finney | June 28, 1932 |
| 2,211,607 | Reimel | Aug. 13, 1940 |
| 2,310,819 | Van Orden | Feb. 9, 1943 |
| 2,318,111 | Steinberger | May 4, 1943 |
| 2,377,650 | Reimel | June 5, 1945 |
| 2,434,541 | Bierer | Jan. 13, 1948 |
| 2,515,778 | Knowland | July 18, 1950 |